Oct. 9, 1962     D. B. DUNCAN ETAL     3,057,211
PROGRAMMED COMPUTER

Filed April 28, 1958

INVENTORS.
DONAL B. DUNCAN
HENRY E. SINGLETON
BY Allan Rothenberg
ATTORNEY 3,057,211
PROGRAMMED COMPUTER
Donal B. Duncan, Arcadia, and Henry E. Singleton, Downey, Calif., assignors to North American Aviation, Inc.
Filed Apr. 28, 1958, Ser. No. 733,226
8 Claims. (Cl. 74—5.34)

The invention relates to computers and more particularly to a computer for use with a programmed inertial navigator.

Inertial guidance systems typically comprise a plurality of acceleration sensing devices which measure vehicle accelerations along the axes of a set of two or more orthogonal axes and a plurality of gyroscopes which define a set of three orthogonal reference axes having some definite relation to inertial space. Inertial or unaccelerated space is in effect the space defined by the fixed stars as distinguished, for example, from the surface of the rotating earth. The gyroscopes are utilized to maintain the accelerometers in a known orientation. Thus, a single integration of acceleration signals will give vehicle velocity components along a set of known axes and a double integration will give displacement or distance made good with reference to such axes. The accelerometers will respond to factors other than those due solely to change of vehicle motion and thus must be biased or torqued to enable the output thereof to be interpreted correctly as changes of motion of the vehicle. The gyroscopes too must be biased or torqued if they are to be maintained in any attitude which is not fixed in relation to inertial space. For this reason the inertial navigator must include a computer which takes into account earth rotation, gravity and other factors and generates the required gyroscope and accelerometer correction torques. These correction torques or signals are termed feedback signals since they are functions of the position and velocity (as determined by the accelerometers) of the vehicle carried navigator.

The position of the vehicle and its navigator on the surface of the earth is defined by two coordinates. In the usual computer these two position coordinates are the inputs from which the computer calculates the feedback terms or approximations to the feedback terms and generates the required functions.

An autonavigator bearing vehicle is frequently programmed to follow a preselected path over the surface of the earth. In accordance with the present invention, knowledge of the programmed path is utilized to provide a programmed computer having a memory or storage for functions of the desired feedback terms which have been previously calculated for a programmed vehicle path. One of the two position coordinates can always be expressed as a function of the other. Thus, the principal feedback terms can be expressed as some function of one coordinate or the product of the rate of change of such coordinate with another function of the one coordinate. There is initially stored in the computer various functions of one position coordinate which is the independent variable of range angle or distance made good. The information stored in the computer is scanned at a rate determined by the independently variable position coordinate which may be the output of one of the accelerometers or distance meters. The term distance meter as used herein designates an acceleration responsive device which may itself singly or doubly integrate acceleration or may be combined with such external integrators as to yield signals proportional to the second integral of acceleration. With the computer memory being scanned in accordance with range angle and the memory bearing functions of the desired feedback terms in terms of range angle, the output of the scanner will either directly provide the desired feedback terms or relatively simple functions thereof.

The recorded functions of range which are carried by the computer, although fairly complex, are substantially functions only of the vehicle path and comprise but relatively small components which depend upon vehicle velocity. Therefore, variations of velocity from programmed values will have little or no effect upon the system.

In the illustrated embodiment of the invention the computer memory is in the form of an elongated record medium or tape having the desired functions of feedback terms coded thereon as binary indicia in the form of punched holes having a density which is the recorded function of range. The tape is scanned by a tape reader at a rate equal to the first derivative of range by causing the range output of the range distance meter to position the tape relative to its reader. A pulse is generated each time a punched hole passes the tape reader whereby the density or repetition rate of the pulses from the tape reader is the product of the recorded function and range rate. Depending upon nature of the recorded function, the pulses from the tape reader, after smoothing to obtain a signal proportional to pulse density, may be integrated, differentiated or fed directly as the desired feedback function.

An object of this invention is to provide an improved inertial navigator.

Another object of this invention is to provide an improved computer.

A further object of this invention is to generate inertial navigator feedback terms substantially independent of programmed velocity.

Still another object of this invention is to provide a computer requiring but a single input.

Another object of the invention is to provide given functions of distance made good by a vehicle travelling a preselected path.

Further objects of this invention will become apparent from the following description taken in connection with the accompanying drawings, in which FIG. 1 is a functional block diagram of an autonavigator utilizing the computer of this invention;

Figure 4:
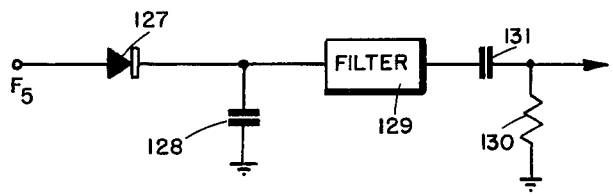

And FIG. 4 illustrates details of a circuit for operating upon certain recorded functions.

In the drawings like reference numerals refer to like parts.

Figure 1:
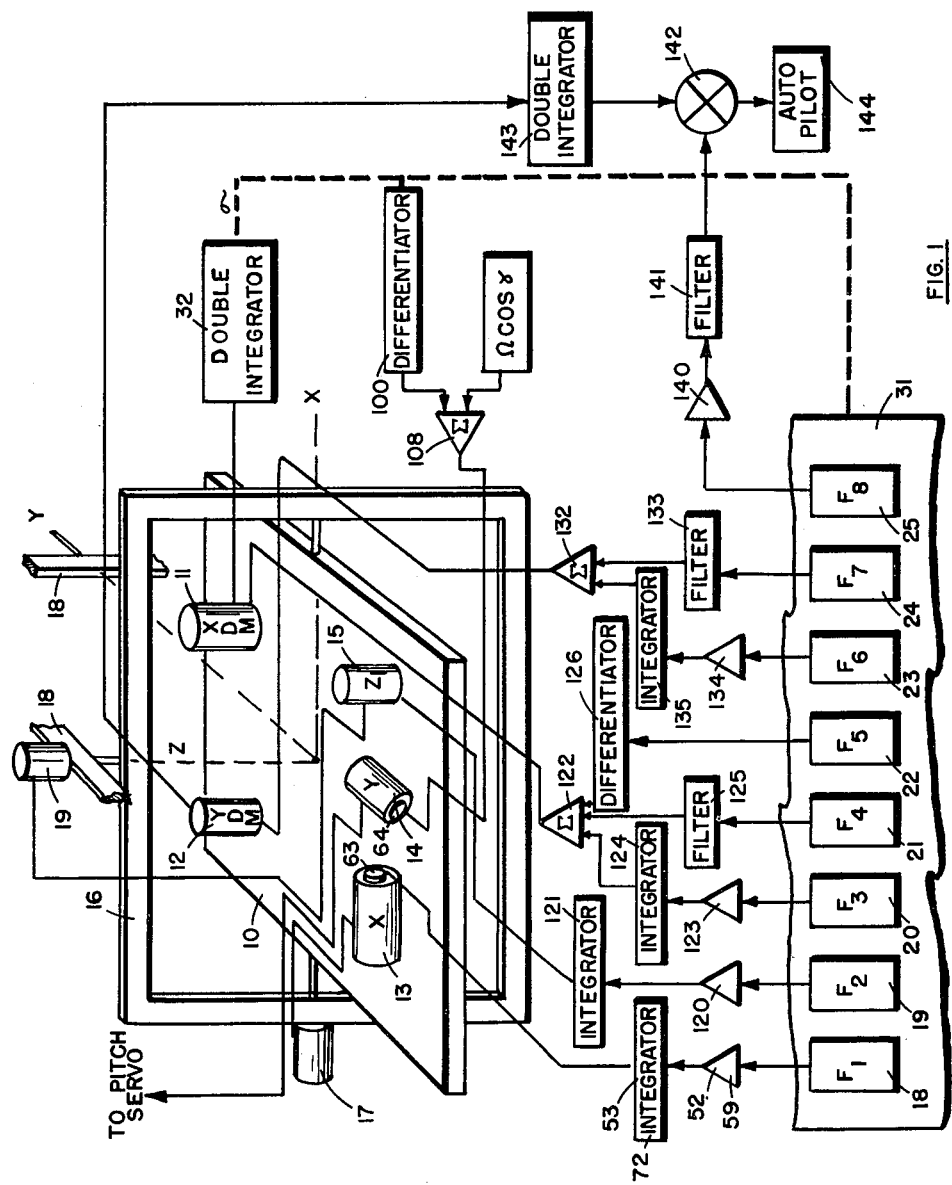

Referring now to FIG. 1, a typical stable platform is illustrated as comprising a platform 10 on which are fixedly mounted X and Y distance meters 11 and 12, and stabilizing single axis gyroscopes 13 (X), 14 (Y) and 15 (Z). The platform 10 is mounted in the vehicle (not shown) to be navigated by means of a three axis gimbal system schematically depicted by gimbals 16 and 18 which, as is well-known, will permit complete (three degree) rotational freedom of the platform with respect to the vehicle. The platform is mounted for rotation about X in roll gimbal 16 which is in turn pivotally mounted for rotation about Z in yaw gimbal 18. The latter is pivoted to the vehicle for rotation in pitch by conventional structure (not shown). Departures of the platform 10 from an attitude defined by the three mutually orthogonal gyroscopes is sensed by gyroscope pick-offs to provide signals to roll and yaw servos 17 and 19 and to the pitch servo (not shown) which rotate the several platform gimbals so as to maintain the platform 10 in the predetermined attitude defined by the gyroscopes collectively. The sensing axes of the accelerometers are mutually orthogonal with accelerometer 11 being sensitive to changes of motion along the X axis (range), and accelerometer 12 being sensitive to changes in motion along the Y axis (lateral deviation from the vehicle path). The particular details of the stable platform, its components, mountings and drives form no part of this invention since the same are well-known to those skilled in the art. Typical three axis stable platforms are shown for example, in an application, Serial No. 442,255, of L. C. Dozier, Jr. for "Autonavigator" and in an article entitled "Inertial Navigation" by J. M. Slater and D. B. Duncan, Aeronautical Engineering Review, January 1956, page 49.

In the typical inertial navigator described herein for purposes of exposition, the vehicle is to travel in a predetermined path over the surface of the earth and the platform is to be maintained locally earth level during travel whereby the mutually orthogonal accelerometer axes will each be maintained horizontal and thus insensitive to gravitational forces. For this reason gyroscope correction torques are required to cause the gyroscopically defined reference attitude to rotate in inertial space as a function of rotation of the earth and the distance made good by the system. The accelerometers or distance meters, although maintained locally earth level by being secured to the platform 10, must also be corrected or torqued for a number of factors. These include ellipticity of the earth which causes the distance meters on the properly oriented platform to sense components of gravity not directed along a radius to the center of the earth. There may also be an error due to the fact that a guidance plane reference system is utilized and the platform is not rotated to compensate for small programmed lateral departure from the guidance plane. Further, rotation of the earth itself produces centrifugal accelerations which exist whether or not the vehicle is moving relative to the earth. Still another unwanted acceleration sensed by the accelerometers is the coriolis acceleration due to the combination of earth rotation and velocity of the vehicle relative to the earth.

It is the function of the computer to provide feedback terms to the several inertial elements, distance meters and gyroscopes, such that the platform will remain locally earth level and the distance meter outputs will be a function solely of the vehicle motion which is to be measured.

As illustrated in FIG. 1, most of the desired feedback terms are obtained by simple operation functions $F_1$ through $F_7$ inclusive of range which are recorded in binary form in seven channels, 18 through 24, of a tape 31. The tape is driven in accordance with distance made good by the vehicle by twice integrating the output of range distance meter 11 in integrator 32 to position the tape relative to the tape reader (shown in FIG. 3) in accordance with distance meter sensed range. The information from the several tape channels, after suitable operations to be described hereinafter, is fed to the several distance meters and gyroscopes as the desired feedback terms.

Figure 2:
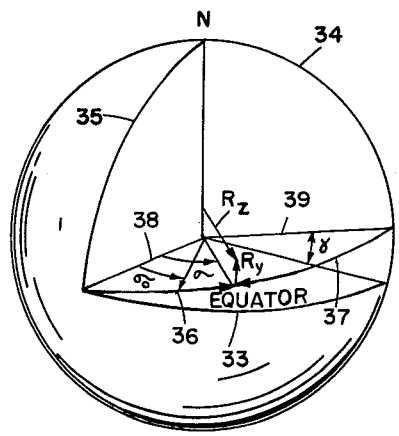
FIG. 2 illustrates geometry of a guidance problem to be handled by an autonavigator.

The geometry of the problem to be solved by the computer is illustrated by the quadrant of the sphere depicted in FIG. 2 where a circular arc 33 represents the equator and arcs 34 and 35 represent polar great circles. The vehicle launched at point 36 travels substantially in a guidance plane containing arc 37 with programmed relatively small lateral departures from the guidance plane which is the plane containing arc 37 and radii 38 and 39. The quantities indicated in FIG. 2 and those in the equations which follow are defined as follows:

$\Omega$ = earth's angular velocity
$\gamma$ = angle between guidance plane and equatorial plane
$g_y$ = $y$ component of gravity read by the distance meter
$g_x$ = $x$ component of gravity read by the distance meter
$R_z$ = distance from central axis of the earth
$a$ = equatorial radius of the earth
$\sigma_0$ = range angle of launch point
$\sigma$ = range angle
$R_y$ = lateral deviation from guidance plane It is to be understood that the invention is capable of mechanization with any desired coordinate system which may be determined, as is well-known to those skilled in the art, by the desired operation of the vehicle. A mechanization for guidance plane coordinate system is illustrated herein solely for purposes of exposition.

In the guidance plane coordinate system, local earth level is obtained by applying to the X, Y and Z gyroscopes the respective torques $\omega_x$, $\omega_y$ and $\omega_z$ which are defined as follows:

$$\omega_x = \Omega \sin \gamma \cos \sigma \tag{1}$$
$$\omega_y = \Omega \cos \gamma + \dot{\sigma} \tag{2}$$
$$\omega_z = \Omega \sin \gamma \sin \sigma \tag{3}$$

The correction signals or feedback torques to the range distance meter 11 can be written as $$\int_{\sigma_0}^{\sigma} F_3 d\sigma + F_4 \dot{\sigma} + \frac{d}{dt}(F_5 \dot{\sigma}) \tag{4}$$

where $$F_3 = \frac{d}{d\sigma}\left[\frac{1}{2}\Omega^2(R_z \sin^2 \gamma \sin 2\sigma + R_y \cos \sigma \sin 2\gamma) + g_x\right] \tag{5}$$

$$F_4 = R_z + \frac{dR_z}{d\sigma}\Omega \cos \gamma - 2\frac{dR_y}{d\sigma}\Omega \sin \sigma \sin \gamma \tag{6}$$

and $$F_5 = R_z - a \tag{7}$$

The feedback to the lateral distance meter 12 may be written as $$\int_{\sigma_0}^{\sigma} F_6 d\sigma + F_7 \dot{\sigma} \tag{8}$$

where $$F_6 = \frac{d}{d\sigma}\left[\frac{1}{2}\Omega^2(R_z \sin 2\gamma \sin \sigma + 2R_y \sin^2 \gamma \cos 2\sigma) + g_y\right] \tag{9}$$

and $$F_7 = 2\Omega R_z \sin \gamma \sin \sigma - 2\frac{dR_z}{d\sigma}\Omega \cos \sigma \sin \gamma \tag{10}$$

Since the X gyroscope torque as defined in Equation 1 is a function of range angle $\sigma$, it can be generated by storing binary information or punched holes having a density $$F_1(\sigma) = \left|\frac{d\omega_x}{d\sigma}\right| = \Omega \sin \gamma \sin \sigma \tag{11}$$

If the number of holes per unit length of tape (hole density) is as expressed in Equation 11 and the tape be driven at a rate equal to the first time derivative of $\sigma$, the number of pulses per unit of time provided by the tape reader will be $$\Omega \sin \gamma \sin \sigma \frac{d\sigma}{dt} \tag{12}$$

which when integrated with respect to time yields $$\int_{\sigma_0}^{\sigma} \Omega \sin \gamma \sin \sigma \frac{d\sigma}{dt} dt = \Omega \sin \gamma \cos \sigma \tag{13}$$

which is the desired X gyroscope feedback torque.

Figure 3:
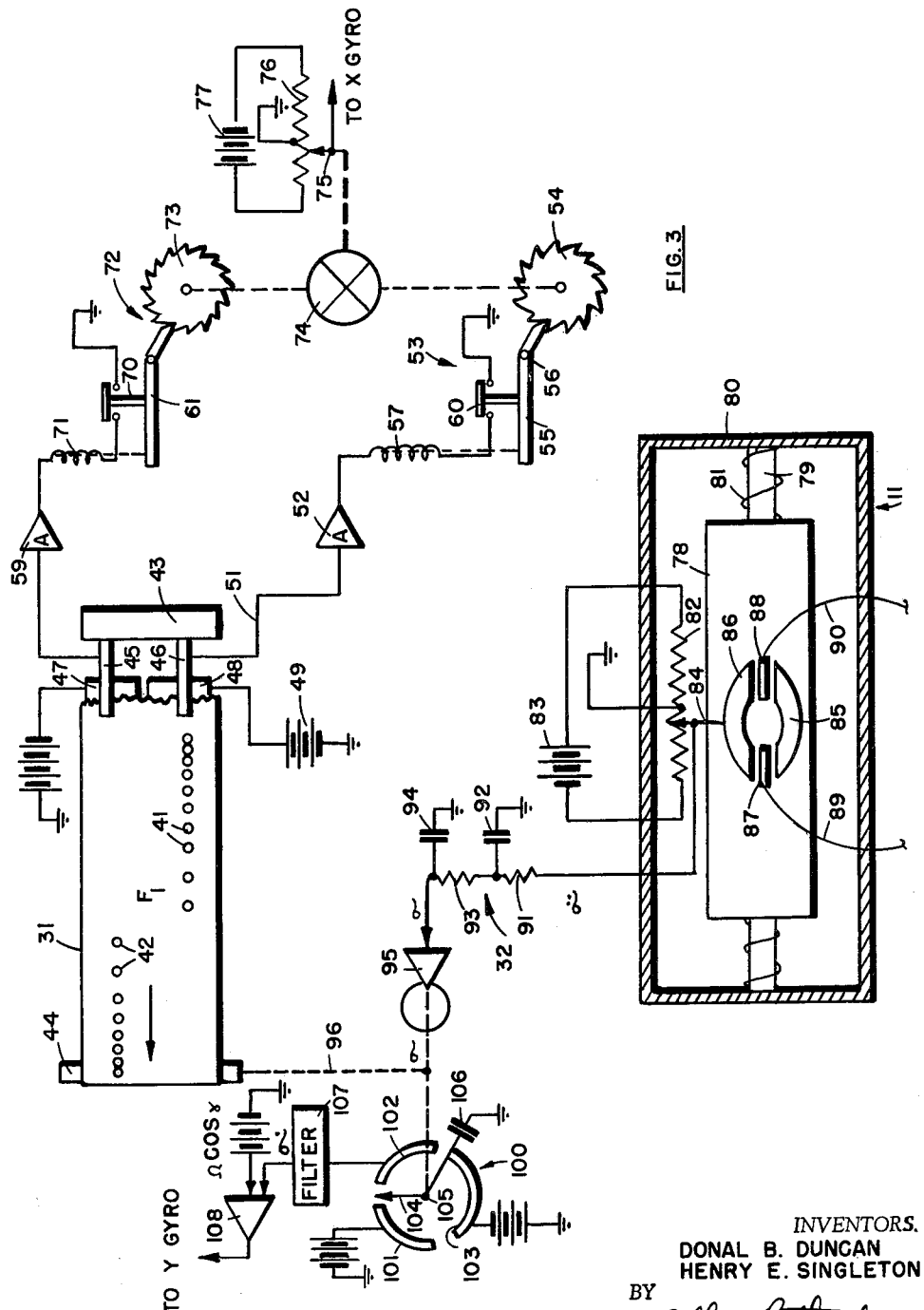
FIG. 3 illustrates certain details of portions of the computer.

The mechanization of the derivation of the X gyroscope feed back torque is illustrated in FIG. 3. The tape 31 is illustrated in FIG. 3 as having but a single channel bearing the function $F_1$ as a plurality of holes 41 punched therebetween and spaced in the direction of tape travel in accordance with the positive values of the function $F_1$.

The $F_1$ channel will also have a laterially displaced line of holes 42 punched therein representing negative values of the function $F_1$. The tape is unwound from a supply roll, not shown, and drawn past reading head 43 by a take-up roll 44 which is driven in accordance with the signal $\sigma$. Thus, the angle of rotation of the take-up roll is proportional to $\sigma$ whereby the tape speed is proportional to $\dot\sigma$ to a degree depending upon the linearity of the driving arrangement. The tape reader 43, of which there may be one provided for each of the recorded functions $F_1$ through $F_8$, comprises a plurality of resilient fingers 45 and 46 which engage contact plates 47 and 48 beneath the tape when a finger is positioned directly over a punched hole. The positive contact plate 48 is coupled to a positive source of potential 49 whereby for each positive hole of the binary function $F_1$, a positive pulse is fed through lead 51 coupled with finger 46 and through amplifier 52 to a stepping motor 53. The stepping motor 53 may be of any suitable type and is herein depicted as a ratchet wheel 54 actuated by a pawl 55, pivoted at 56. The pawl 55 comprises a solenoid arm actuated by coil 57 which is connected to the output of amplifier 52 and grounded through normally closed switch 60. Similarly, the pulses indicative of negative values of $F_1$ are fed from finger 45 through amplifier 59, coil 71 and switch 70 of a stepping motor 72 comprising ratchet 73 and actuator pawl 61. The stepping motors thus integrate the tape reader output and provide an output shaft rotation of magnitude proportional to such integral. The positive and negative shaft rotation outputs of the stepping motors are combined in differential gear 74 to provide a shaft output which drives wiper arm 75 of a center tap grounded potentiometer 76 which is energized by a potential source 77. Within the limits of linearity of the potentiometer, the voltage on arm 75 will thus be proportional to the integral of $F_1$ with respect to range angle $\sigma$. This voltage is the desired feedback torque to torquer 63 of the X gyroscope 13. While the distance meters may be of the type giving output proportional to acceleration or to the first or second time integral of acceleration, there is selected for purposes of illustration a nonintegrating accelerometer. Accelerometer 11, as shown in FIG. 3, may basically comprise a mass 78 slidably constrained for movement along shaft 79 fixed to accelerometer case 80 and spring restrained by a spring 81. Potentiometer 82 fixed to case 80 is center tapped to ground and excited by a suitable source of electric potential 83. A wiper arm 84 carried by mass 78 cooperates with potentiometer resistance 82 to provide an output signal between the arm 84 and the potentiometer center tap which is proportional to the displacement of the mass 78. The case 80 may be filled with a suitable fluid for damping purposes. Assuming linearity of the spring and potentiometer and negligible friction, the electrical output will be proportional in sense and magnitude to acceleration sensed along the axis of shaft 79 of the range distance meter 11.

Since any acceleration sensed by the accelerometer, whether wanted or unwanted, will be manifested as a displacement of the mass 78, unwanted accelerations may be compensated for by simulating the effects thereof. Thus, the feedback term to the distance meter is applied as a force exerted on the mass 78 in the direction of its sensitive axis. The feedback is applied as a correction signal or "torque" of a magnitude and direction equal and opposite respectively to the magnitude and direction of the unwanted acceleration components. The correction force is exerted by the distance meter torquer comprising a pair of permanent C-shaped magnets 85 and 86 fixed to the mass 78 and a pair of torquer coils 87, 88 carried by the case 80 and positioned between the respective magnetic gaps of the permanent magnets. The coils 87, 88 are oriented with their axes normal to the adjacent pole faces of the magnets whereby the D.-C. feedback component to the distance meter applied to one or both of the coils through one or both of leads 89 and 90, respectively, will exert a force or torque which tends to linearly displace the mass relative to its case to provide the desired distance meter bias. The term "torque" does not rigorously apply to a linearly movable acceleration sensitive mass but is included herein as being applicable to those conventional distance meters which embody a pivotally mounted mass. The distance meter, when in the form of a nonintegrating accelerometer as illustrated, may include an electrical device for doubly integrating the output thereof shown here as a pair of resistance-capacitance integrators 91, 92 and 93, 94. The output of the double integrator 32, the range angle $\sigma$, is fed to servo motor 95 which thus will provide an output in the form of a rotary shaft displacement proportional in angular magnitude and direction to the magnitude and direction of sensed acceleration as corrected by the applied feedback term. The shaft displacement output of the servo motor 95 is caused to drive the tape pick-up roll 44 through any suitable mechanical means schematically indicated by the dotted line 96. Thus, the tape 31 is driven to cause scanning thereof by the tape reader 43 at a rate proportional to the time rate of change of measured range. In other words, at any input the tape will have moved relative to the tape reader a distance proportional to distance made good by the navigator.

As indicated in Equation 2, the Y gyroscope feedback torque is proportional to the sum of a constant and range rate. An exemplary mechanization of differentiation of the range output of servo motor 95 is illustrated in FIG. 3 as comprising a capacitor tachometer 100. The tachometer comprises a plurality of electrically conductive circular plate segments 101, 102 and 103 arranged to be successively contacted by the end of a wiper arm 104 journalled at 105 and rotated by the shaft output of servo motor 95. Plates 101 and 103 are respectively connected to positive and negative potentials while the arm 104 is coupled to a capacitor 106. In operation of the tachometer, assume arm 104 to be initially in contact with plate 101 whereby the capacitor 106 has a positive charge applied thereto. Upon clockwise rotation of arm 104 the positive capacitor charge will be transferred to plate 102 to which the output of the tachometer may be connected through a suitable filter 107. Upon further clockwise rotation of arm 104 the positive charge, if any, which is left upon the capacitor 106, is removed upon contact of the arm 104 with the negative plate 103. The arm 104 then rotates to again contact plate 101, again positively charging the capacitor to permit transfer of such positive charge to the plate 102. Thus a positive charge is transferred to the output plate 102 each time the arm 104 makes one revolution. Since the output is smoothed by filter 107, there is produced at the filter output a D.-C. level rather than a series of pulses, and the value of this output depends solely on the rate at which the shaft rotates. It will readily be seen that upon counterclockwise rotation of the arm 104 which, of course, will not occur when the arm is driven according to distance made good, a negative charge will be transferred to output plate 102 for each shaft revolution. The output $\dot\sigma$ of filter 107 is fed as one input to a summing amplifier 108 which has as the other input thereto a signal of magnitude $\Omega\cos\gamma$ supplied by any suitable fixed potential source. The output of the amplifier 108 is thus the desired feedback to torquer 64 of the Y gyroscope 14 as expressed in Equation 2.

In FIG. 3 there is illustrated the mechanization of two of the desired feedback components. The mechanization of the other feedback components may be fundamentally similar. As illustrated in FIG. 1, the tape 31 actually will comprise eight channels 18 through 25, each of which will have a pair of rows of punched holes and a tape reader therefor which may be identical to the tape reader described in connection with FIG. 3. Of course, only one row of binary indicia will be required for those feedback terms which do not change sign and other well-known ways of properly accounting for sign may be used.

The Z gyroscope torque defined in Equation 3 may be expressed as $$F_2(\sigma) = \Omega \sin \gamma \cos \sigma$$

Thus, the feedback to the Z gyroscope torquer (not shown) may be obtained in a fashion identical to that of the X gyroscope feedback. The output of the tape reader of the $F_2$ channel is fed through amplifier 120 to step motor integrator 121 and thence to the torquer (not shown) of gyroscope 15.

The X distance meter feedback term is supplied by the output of summing amplifier 122 which sums functions of three terms, $F_3$, $F_4$ and $F_5$ caried on the tape. The first input to the summing amplifier 122 may be derived from the $F_3$ channel tape reader through amplifier 123 and integrating step motor 124 in the same manner as the X and Z gyroscope torques. The second input to summing amplifier 122 may be derived directly from the $F_4$ tape channel which will provide an output proportional to the product of the recorded function $F_4$ and the time rate of change of $\sigma$. Thus, the density of the holes punched in the $F_4$ channel will be proportional to the ratio of the desired feedback component (the second term of Equation 4 to the time derivative of $\sigma$. The scanning of the tape by the tape reader at the rate of $\dot{\sigma}$ effects multiplication of the hole density $F_4$ by $\dot{\sigma}$ to provide directly the desired feedback component. If desired, a filter 125 may be interposed between the tape reader of channel 21 and the amplifier 122 to provide smoothing of the tape reader output. The third input to summing amplifier 122 is derived from the tape channel 22 which has stored therein holes of a density equal to the ratio of the integral of the desired feedback component (the third term of Equation 4) to the time derivative of $\sigma$. Again the output of the tape reader is the recorded function $F_5$ multiplied by the range rate which in this instance is equal to the integral of the desired feedback component. The output of the tape reader for channel 22 is therefore differentiated in a differentiator 126 of which the output is applied as the third input to summing amplifier 122.

As indicated in FIG. 4, differentiation of the output of the tape reader of channel 22 may be effected by feeding the tap reader output through diode 127 across capacitor 128 through filter 129 to resistance-capacitance differentiating network 130, 131. Thus, the output of the differentiator 130, 131 will comprise the desired feedback component which is the third input to the amplifier 122.

The feedback to the lateral or Y distance meter 12 is derived as the output of the summing amplifier 132 which has as one input thereof the output of a smoothing filter 133 to which is connected the output of the tape reader of the $F_7$ function channel 24. A second input to amplifier 132 is derived from the tape reader of the $F_6$ channel 23 in identical fashion to the derivation of the feedback components from the $F_1$ and $F_2$ channels 18 and 19. The output of the tape reader of the $F_6$ channel is fed through amplifier 134 to step motor integrator 135 whereby the output of the potentiometer arm of the step motor is the desired component of the Y distance meter feedback term. It is to be understood that the integrators 121, 124 and 135 may be identical with the step motor integrators of FIG. 3 which comprises step motors 53, 72, differential 74 and the output of the potentiometer 76. Where the sign of the feedback term may vary, positive and negative rows of binary information are embodied in each tape channel and the outputs of the two tape reading fingers for the particular channel are combined either electrically or mechanically as indicated in FIG. 3.

Where the vehicle is programmed for some departure ($R_y$) from the guidance plane, there is provided the channel 25 having punched holes of a density $F_8$ equal to the ratio of the programmed values of $R_y$ to the time rate of change of $\sigma$. Thus, the output of the $F_8$ tape reader in channel 25 will comprise pulses at a frequency equal to the desired or programmed lateral deviation which pulses may be amplified in amplifier 140, smoothed in filter 141 and applied as one input to a comparator 142. The output of the lateral distance meter comprising accelerometer 12 and double integrator 143 is applied as the second input to the comparator 142 which provides as its output a signal to the autopilot 144 which is proportional to the difference between the programmed value of $R_y$ and the value thereof as measured by the distance meter.

While the record medium for storing the desired functions of the feedback terms has been herein illustrated as a punched tape and mechanical reader, it will be readily appreciated that a photoelectric reader could be utilized or there could be substituted for the punched tape record any one of several other well-known binary recording mediums and readers such as, for example, magnetic tape, discs or drums and suitable reading means therefor. While the digital techniques of storing the desired functions in binary form are preferred, the principles of this invention may equally well be mechanized through the use of analog recording of the desired functions.

From the preceding description, it will be seen that there has been provided a novel navigator computer having but a single measured input in the form of distance made good by the navigator wherein most of the relatively complex calculations are eliminated by recording in the computer storage the desired feedback terms as functions of the single measured input.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A navigator comprising a platform, a distance meter on said platform, a plurality of gyroscopes on said platform connected to stabilize said platform and distance meter, a storage device having stored therein gyroscope and distance meter correction information as preselected functions of distance made good by said navigator, a storage readout connected to read the information stored in said device, and drive means coupled with said distance meter for causing said readout to scan said storage device in accordance with the distance made good by said navigator, said readout being connected to feed correction information to said gyroscopes and distance meter.

2. An inertial navigator comprising a stable platform including X, Y and Z gyroscopes for effecting stabilization thereof; each gyroscope having a correction torquer; X and Y distance meters on said platform, each having a correction torquer; a record medium having eight channels of stored data; a record reader for each of said channels; a motor connected to drive said medium and having an input connected to said X distance meter; a first summing amplifier having an output and first and second inputs, a fixed voltage source connected to said first input, a differentiator having an input connected with said X distance meter and an output connected with said second input, said amplifier output being connected with said Y gyroscope torquer; a first integrator connector between said first channel reader and said X gyroscpoe torquer; a second integrator connected between said second channel reader and said Z gyroscope torquer; a second summing amplifier having an output connected to said X distance meter torquer and having three inputs, an integrator connected between said third channel reader and a first input of said second amplifier, a second input of said second amplifier being connected to said fourth channel reader, a differentiator connected between said fifth channel reader and a third input of said second amplifier; a third summing amplifier having an output connected with said Y distance meter torquer and having two inputs, an integrator connector between said sixth channel reader and said first input of said third amplifier, said second input of said third amplifier being connected with said seventh channel reader; an error comparator having a first input connected to said eighth channel reader, and a second input connected to said Y distance meter.

3. In combination with an inertial navigator having a plurality of gyroscopes and distance meters, a programmed computer comprising a record medium having navigator corrector information coded thereon in binary form as a function of distance made good by said navigator, readout means for reading said coded information, means responsive to one of said distance meters for traversing said medium relative to said readout means at a rate proportional to the rate of change of distance made good, means responsive to said readout means for applying correction signals to said navigator, a portion of said correction information being coded on said medium as binary indicia having a density which is the first derivative with respect to distance of a desired component of correction signal, said readout responsive means for said portion including means for integrating the output of said readout means with respect to time.

4. In combination with an inertial navigator having a plurality of gyroscopes and distance meters, a programmed computer comprising a record medium having navigator correction information coded thereon in binary form as a function of distance made good by said navigator, readout means for reading said coded information, means responsive to one of said distance meters for traversing said medium relative to said readout means at a rate proportional to the rate of change of distance made good, means responsive to said readout means for applying correction signals to said navigator, a portion of said correction information being coded on said medium as binary indicia having a density which is the radio of a desired correction component signal to the derivative of distance with respect to time, whereby said readout means for said portion provides said desired component.

5. In combination with an inertial navigator having a plurality of gyroscopes and distance meters, a programmed computer comprising a record medium having navigator correction information coded thereon in binary form as a function of distance made good by said navigator, readout means for reading said coded information, means responsive to one of said distance meters for traversing said medium relative to said readout means at a rate proportional to the rate of change of distance made good, means responsive to said readout means for applying correction signals to said navigator, a portion of said correction information being coded on said medium as binary indicia having a density which is the ratio of (1) the integral with respect to time of a desired component of correction signal to (2) the time derivative of distance.

6. A programmed computer for generating functions of a depedent position coordinate in terms of an independent position coordinate comprising a record medium having coded thereon a plurality of binary indicia, the number of indicia per unit length of said medium representing the value of said dependent position coordinate, means for generating a drive signal proportional to said independent position coordinate, reading means for scanning said medium to generate an output signal proportional to the number of indicia scanned thereby, and drive means responsive to said drive signal generating means for positioning said reading means in its scan in accordance with the value of said independent coordinate.

7. In combination with an inertial navigator having a plurality of gyroscopes and distance meters, a programmed computer comprising a record medium having feedback torques for said gyroscopes and distance meters coded thereon as preselected functions of distance made good by said navigator, readout means for reading said coded torques, means responsive to one of said distance meters for traversing said medium relative to said readout means, and means responsive to said readout means for applying correction torques to said gyroscopes and meters as selected functions of the information read by said readout means.

8. A programmed computer for generating functions of a dependent variable in terms of an independent position coordinate comprising a record medium having coded thereon a plurality of binary indicia, the number of indicia per unit length of said medium representing the value of said dependent variable, means for generating a drive signal proportional to said independent position coordinate, reading means for scanning said medium to generate an output signal proportional to the number of indicia scanned thereby, and drive means responsive to said drive signal generating means for positioning said reading means in its scan in accordance with the value of said independent coordinate.

References Cited in the file of this patent

UNITED STATES PATENTS

| | | |
|---|---|---|
| 2,762,123 | Schultz | Sept. 11, 1956 |
| 2,877,415 | Rolle | Mar. 10, 1959 |
| 2,883,109 | Oshima | Apr. 21, 1959 |
| 2,946,539 | Fischel | July 26, 1960 |